US007962330B2

(12) United States Patent
Goronzy et al.

(10) Patent No.: US 7,962,330 B2
(45) Date of Patent: Jun. 14, 2011

(54) APPARATUS AND METHOD FOR AUTOMATIC DISSECTION OF SEGMENTED AUDIO SIGNALS

(75) Inventors: Silke Goronzy, Fellbach-Schmiden (DE); Thomas Kemp, Esslingen (DE); Ralf Kompe, Röttenbach (DE); Yin Hay Lam, Stuttgart (DE); Krzysztof Marasek, Warsaw (PL); Raquel Tato, Stuttgart (DE)

(73) Assignee: Sony Deutschland GmbH, Cologne (DE)

( * ) Notice: Subject to any disclaimer, the term of this patent is extended or adjusted under 35 U.S.C. 154(b) by 998 days.

(21) Appl. No.: 10/985,451

(22) Filed: Nov. 10, 2004

(65) Prior Publication Data
US 2005/0160449 A1    Jul. 21, 2005

(30) Foreign Application Priority Data

Nov. 12, 2003  (EP) .................................. 03026047

(51) Int. Cl.
G10L 19/00 (2006.01)
G10L 11/00 (2006.01)
G10L 15/00 (2006.01)
G06F 17/00 (2006.01)
H04N 7/16 (2011.01)
H04N 7/173 (2011.01)

(52) U.S. Cl. .......... 704/201; 704/200; 704/231; 700/94; 725/9; 725/86; 707/913

(58) Field of Classification Search ........... 704/240–250
See application file for complete search history.

(56) References Cited

U.S. PATENT DOCUMENTS

| 5,754,939 | A |   | 5/1998 | Herz et al. |
| 5,798,785 | A | * | 8/1998 | Hendricks et al. .............. 725/46 |
| 5,912,696 | A | * | 6/1999 | Buehl ............................. 725/28 |
| 6,185,527 | B1 |  | 2/2001 | Petkovic et al. |
| 6,199,076 | B1 | * | 3/2001 | Logan et al. .................. 715/203 |
| 6,345,252 | B1 | * | 2/2002 | Beigi et al. .................... 704/272 |

(Continued)

FOREIGN PATENT DOCUMENTS
WO     WO 02/25939       3/2002

OTHER PUBLICATIONS

Ioannou, S., Moschovitis, G., Ntalianis, K., Karpouzis, K., and Kollias, S. 2000. Effective access to large audiovisual assets based on user preferences. In Proceedings of the 2000 ACM Workshops on Multimedia (Los Angeles, California, United States, Oct. 30-Nov. 3, 2000).*

(Continued)

Primary Examiner — James S Wozniak
Assistant Examiner — Matthew H Baker
(74) Attorney, Agent, or Firm — Oblon, Spivak, McClelland, Maier & Neustadt, L.L.P.

(57) ABSTRACT

An apparatus for automatic dissection of segmented audio signals, wherein at least one information signal for identifying programs included in said audio signals and for identifying contents included in said programs. Content detection device detects programs and contents belonging to the respective programs in the information signal. Program weighting device weights each program includes in the information signal based on the contents of the respective program detected by the content detection device. Program ranking device indentifies programmers of the same category and ranking said programs based on a weighting result for each program provided by the program weighting device.

22 Claims, 4 Drawing Sheets

U.S. PATENT DOCUMENTS

| | | | |
|---|---|---|---|
| 6,710,822 B1* | 3/2004 | Walker et al. | 348/722 |
| 6,928,407 B2* | 8/2005 | Ponceleon et al. | 704/253 |
| 6,996,171 B1* | 2/2006 | Walker et al. | 375/240.09 |
| 7,096,486 B1* | 8/2006 | Ukai et al. | 725/58 |
| 7,370,276 B2* | 5/2008 | Willis | 715/747 |
| 7,581,237 B1* | 8/2009 | Kurapati | 725/46 |
| 7,600,244 B2* | 10/2009 | Maruyama et al. | 725/47 |
| 7,716,704 B2* | 5/2010 | Wang et al. | 725/46 |
| 2002/0093591 A1 | 7/2002 | Gong et al. | |
| 2003/0093329 A1* | 5/2003 | Gutta | 705/26 |
| 2003/0093790 A1* | 5/2003 | Logan et al. | 725/38 |
| 2003/0097186 A1* | 5/2003 | Gutta et al. | 700/1 |
| 2003/0097196 A1* | 5/2003 | Gutta et al. | 700/100 |
| 2004/0070594 A1* | 4/2004 | Burke | 345/716 |
| 2004/0078188 A1* | 4/2004 | Gibbon et al. | 704/1 |
| 2005/0102135 A1 | 5/2005 | Goronzy et al. | |
| 2005/0114388 A1 | 5/2005 | Goronzy et al. | |
| 2009/0031882 A1 | 2/2009 | Kemp et al. | |
| 2009/0069914 A1 | 3/2009 | Kemp et al. | |

OTHER PUBLICATIONS

Rui, Gupta, Acero. Automatically extracting highlights for TV Baseball programs. International Multimedia Conference, Proceedings of the eighth ACM international conference on Multimedia, pp. 105-115. 2000.*

Ziyou Xiong, Regunathan Radhakrishnan, Ajay Divakaran, Thomas S. Huang. Audio Events Detection Based Highlights Extraction from Baseball, Golf and Soccer Games in a Unified Framework (2003). ICASSP 2003.*

Tjondronegoro, D., Chen, Y. P., and Pham, B. 2003. Sports video summarization using highlights and play-breaks. In Proceedings of the 5th ACM SIGMM international Workshop on Multimedia information Retrieval (Berkeley, California, Nov. 7-7, 2003). MIR '03. ACM, New York, NY, 201-208. DOI= http://doi.acm.org/10.1145/973264.973296.*

Xu, M., Maddage, N. C., Xu, C., Kankanhalli, M., and Tian, Q. 2003. Creating audio keywords for event detection in soccer video. In Proceedings of the 2003 international Conference on Multimedia and Expo—vol. 1 (Jul. 6-9, 2003). ICME. IEEE Computer Society, Washington, DC, 281-284.*

MPEG audio bitstream processing towards the automatic generation of sports programme summaries Sadlier, D.A. Marlow, S. O'Connor, N. Murphy, N. Centre for Digital Video Process., Dublin City Univ., Ireland; This paper appears in: Multimedia and Expo, 2002. ICME '02. Proceedings. Publication Date: 2002.*

Liu, Z., Wang, Y., and Chen, T. 1998. Audio Feature Extraction and Analysis for Scene Segmentation and Classification. J. VLSI Signal Process. Syst. 20, 1/2 (Oct. 1998), 61-79. DOI= http://dx.doi.org/10.1023/A:1008066223044.*

Centintemel U et al: "Self-adaptive user profiles for large-scale data delivery" Proceedings. 16th International Conference on Data Engineering, Feb. 29, 2000-Mar. 3, 2000, pp. 622-633, XP010378759.

U.S. Appl. No. 12/369,352, filed Feb. 11, 2009, Kemp.

Tzanetakis G. et al., "Marsyas: A framework for audio analysis, Department of Computer Science and Depart of Music", Princeton University, Princeton, New Jersey, pp. 1-10.

Liu Z. et al., "Audio Feature Extraction and Analysis for Scene Segmentation and Classification", Polytechnic University and Carnegie Mellon University, Brooklyn, New York, Pittsburgh, Pennsylvania, pp. 1-39.

Kimber, D. et al., "Acoustic Segmentation for Audio Browsers", Xerox PARC and FX Palo Alto Laboratory, Palo Alto, California.

Harb, H. et al., "Speech/Music/Silence and Gender Dectection Algorithm", Lab. ICTT Dept. Mathmatics—Informatique, Cedex, France.

Rabiner, Larence R., "A Tutorial on Hidden Markov Models and Selected Applications in Speech Recognition", Proceedings of the IEEE, vol. 77, No. 2, Feb. 1989. pp. 257-286.

U.S. Appl. No. 12/593,927, filed Sep. 30, 2009, Kemp.

* cited by examiner

APPARATUS AND METHOD FOR AUTOMATIC DISSECTION OF SEGMENTED AUDIO SIGNALS

The present application is based on and claims the benefit of priority under 35 U.S.C. §119 from prior European Patent Application (EPO) No. 03 026 047.5, filed Nov. 12, 2003, the entire contents of which are incorporated herein.

The present invention relates to an apparatus and method for dissection of segmented audio signals comprising the features of the preambles of independent claims 1 and 17, respectively.

There is a growing amount of video data (comprising sampled video signals) available on the Internet and in a variety of storage media e.g. digital video discs. Furthermore, said video data is provided by a huge number of telestations as an analog or digital video signal.

The video data is a rich multilateral information source containing speech, audio, text, colour patterns and shape of imaged objects and motion of these objects.

Currently, there is a desire for the possibility to search for segments of interest (e.g. certain topics, persons, events or plots etc.) in said video data.

In principle, any video signal can be primarily classified with respect to its general subject matter. The general subject matter frequently is referred to as "category".

If the video signal is a tv-broadcast, said general subject matter (category) might be news or sports or movie or documentary film, for example In the present document, a self-contained video signal belonging to one general subject matter (category) is referred to as "programme".

For example, each single telecast, each single feature film, each single newsmagazine and each single radio drama is referred to as programme.

Usually each programme contains a plurality of self-contained activities (events). In this regard, only self-contained activities (events) having a certain minimum importance are accounted for.

If the general subject matter (category) is news and the programme is a certain newsmagazine, for example, the self-contained activities might be the different notices mentioned in said newsmagazine. If the general subject matter (category) is sports and the programme is a certain football match, for example, said self-contained activities might be kick-off, penalty kick, throw-in etc.

In the following, said self-contained activities (events) which are included in a certain programme and meet a minimum importance are called "contents".

Thus, each video signal firstly is classified with respect to its category (general subject matter).

Within each category the video signal is classified with respect to its programme (self-contained video signal belonging to one category).

The programmes are further classified with respect to its respective contents (self-contained activities (important events)).

The traditional video tape recorder sample playback mode for browsing and skimming an analog video signal is cumbersome and inflexible. The reason for this problem is that the video signal is treated as a linear block of samples. No searching functionality (except fast forward and fast reverse) is provided.

To address this problem some modern video tape recorder comprise the possibility to set indexes either manually or automatically each time a recording operation is started to allow automatic recognition of certain sequences of video signals. It is a disadvantage with said indexes that the indexes are not adapted to individually identify a certain sequence of video signals.

On the other hand, digital video discs comprise video data (digitised video signals), wherein chapters are added to the video data during the production of the digital video disc. Said chapters normally allow identification of the story line, only. Especially, said chapters do not allow identification of certain contents (self-contained activities/events having a certain minimum importance) comprised in the video data.

Moreover, during the last years electronic program guide (EPG) systems have been developed.

An electronic program guide (EPG) is an application used with digital set-top-boxes and newer television sets to list current and scheduled programs that are or will be available on each channel and a short summary or commentary for each program. EPG is the electronic equivalent of a printed television programme guide.

Usually, an EPG is accessed using a remote control device. Menus are provided that allow the user to view a list of programmes scheduled for the next few hours up to the next seven days. A typical EPG includes options to set parental controls, order pay-per-view programming, search for programmes based on theme or category, and set up a VCR to record programmes. Each digital television (DTV) provider offers its own user interface and content for its EPG. Up to know the format of the EPG is highly depending on the respective provider. The standards developed so far (e.g. the MHP-standard) still are not yet enforced.

Thus, video data suitable for EPG usually is composed of an audio signal, a picture signal and an information signal. Although EPG allows identification of programmes and of the general subject matter (category) the respective programmes belong to, EPG does not allow identification of certain contents included in the respective programmes.

It is a disadvantage with EPG that the information provided by the EPG still has to be generated manually by the provider of the EPG. As said before, this is very sumptuously and thus costly. Furthermore, typical EPG information comprises information about the content of a film as a whole, only. A further subdivision of the respective film into individual contents (self-contained activities/plots) is not provided.

An obvious solution for the problem of handling large amounts of video signals would be to manually segment the video signals of each programme into segments according to its contents and to provide a detailed information with respect to the video signal included in said segments.

Due to the immense amount of video sequences comprised in the available video signals, manual segmentation is extremely time-consuming and thus expensive. Therefore, this approach is not practicable to process a huge amount of video signals.

To solve the above problem approaches for automatic segmentation of video signals have been recently proposed.

Possible application areas for such an automatic segmentation of video signals are digital video libraries or the Internet, for example.

Since video signals are composed of at least a picture signal and one or several audio signals an automatic video segmentation process could either rely on an analysis of the picture signal or the audio signals or on both.

In the following, a segmentation process which is focused on analysis of the audio signal of video signals is further discussed.

It is evident that this approach is not limited to the audio signal of video signals but might be used for any kind of audio signals except physical noise. Furthermore, the general considerations can be applied to other types of signals, e.g. analysis of the picture signal of video signals, too.

The known approaches for the segmentation process comprise clipping, automatic classification and automatic segmentation of the audio signals contained in the video signals.

"Clipping" is performed to partition the audio signals (and corresponding video signals) into audio clips (and corresponding video clips) of a suitable length for further processing. The audio clips comprise a suitable amount of audio signals, each. Thus, the accuracy of the segmentation process is depending on the length of said audio clips.

"Classification" stands for a raw discrimination of the audio signals with respect to the origin of the audio signals (e.g. speech, music, noise, silence and gender of speaker). Classification usually is performed by signal analysis techniques based on audio class classifying rules. Thus, classification results in a sequence of audio signals which are partitioned with respect to the origin of the audio signals.

Audio class classifying rules can be explicitly or implicitly encoded in statistical or neuronal networks like models.

"Segmentation" stands for segmenting the audio signals (video signals) into individual sequences of cohesive audio clips wherein each sequence contains a content (self-contained activity of a minimum importance) included in the audio signals (video signals) of said sequence. Segmentation usually is performed based on content classifying rules.

Each content comprises all the audio clips which belong to the respective self-contained activity/important event comprised in the audio signal (e.g. a goal, a penalty kick of a football match or different news during a news magazine).

A segmentation apparatus 40 for automatic segmentation of audio signals according to the prior art is shown in FIG. 4.

The effect of said segmentation apparatus 40 on an audio signal 50 is shown in FIG. 5.

The segmentation apparatus 40 comprises audio signal input means 42 for supplying a raw audio signal 50 via an audio signal entry port 41.

In the present example, said raw audio signal 50 is part of a video signal stored in a suitable video format in a hard disc 48.

Alternatively, said raw audio signal might be a real time signal (e.g. an audio signal of a conventional television channel), for example.

The audio signals 50 supplied by the audio signal input means 42 are transmitted to audio signal clipping means 43. The audio signal clipping means 43 partition the audio signals 50 (and the respective video signals) into audio clips 51 (and corresponding video clips) of a predetermined length.

The audio clips 51 generated by the audio signal clipping means 43 are further transmitted to class discrimination means 44.

The class discrimination means 44 discriminates the audio clips 51 into predetermined audio classes 52 based on predetermined audio class classifying rules by analysing acoustic characteristics of the audio signal 50 comprised in the audio clips 51, whereby each audio class identifies a kind of audio signals included in the respective audio clip.

Each of the audio class classifying rules allocates a combination of certain acoustic characteristics of an audio signal to a certain kind of audio signal.

Here, the acoustic characteristics for the audio class classifying rule identifying the kind of audio signals "silence" are "low energy level" and "low zero cross rate" of the audio signal comprised in the respective audio clip, for example.

In the present example an audio class and a corresponding audio class classifying rule for each silence (class 1), speech (class 2), cheering/clapping (class 3) and music (class 4) are provided.

Said audio class classifying rules are stored in the class discrimination means 44.

The audio clips 52 discriminated into audio classes by the class discrimination means 44 are supplied to segmenting means 45.

A plurality of predetermined content classifying rules are stored in the segmenting means 45. Each content classifying rule allocates a certain sequence of audio classes of consecutive audio clips to a certain content.

In the present example a content classifying rule for each a "free kick" (content 1), a "goal" (content 2), a "foul" (content 3) and "end of game" (content 4) are provided.

It is evident that the contents comprised in the audio signals are composed of a sequence of consecutive audio clips, each. This is shown by element 53 of FIG. 5.

Since each audio clip can be discriminated into an audio class each content comprised in the audio signals is composed of a sequence of corresponding audio classes of consecutive audio clips, too.

Therefore, by comparing a certain sequence of audio classes of consecutive audio clips which belongs to the audio signals with the sequences of audio classes of consecutive audio clips which belong to the content classifying rules the segmenting means 45 detects a rule which meets the respective sequence of audio classes.

In consequence, the content allocated to said rule is allocated to the respective sequence of consecutive audio clips which belongs to the audio signals.

Thus, based on said content classifying rules the segmenting means 45 segments the classified audio signals provided by the discrimination means 44 into a sequence of contents 53 (self-contained activities).

In the present example, an output file generation means 46 is used to generate an video output file containing the audio signals 50, the corresponding video signals and an information signal regarding to the corresponding sequence of contents 53.

Said information signal indicates the start time, end time of each programme together with information regarding said programme. Furthermore, the information signal comprises the start time, end time of each content comprised in each programme together with information identifying the self-contained activity (important event) comprised in said content.

Said output file is stored into a hard disc 48 via a signal output port 47.

By using a video playback apparatus 49 the video output files stored in the hard disc 48 can be played back.

In the present example, the video playback apparatus 49 is a digital video recorder which is further capable to extract or select individual contents comprised in the video output file based on the information regarding the sequence of contents 53 comprised in the video output file. The video recorder can be based on optical or magnetic discs, for example.

Thus, segmentation of audio signals with respect to its contents is performed by the segmentation apparatus 40 shown in FIG. 4.

A stochastic signal model frequently used with classification of audio data is the HIDDEN MARKOV MODEL which is explained in detail in the essay "A Tutorial on Hidden Markov Models and Selected Applications in Speech Recognition" by Lawrence R. RABINER published in the Proceedings of the IEEE, Vol. 77, No.2, February 1989.

Different approaches for audio-classification-segmentation with respect to speech, music, silence and gender are disclosed in the paper "Speech/Music/Silence and Gender Detection Algorithm" of Hadi HARB, Liming CHEN and Jean-Yves AULOGE published by the Lab. ICTT Dept. Mathematiques—Informatiques, ECOLE CENTRALE DE LYON. 36, avenue Guy de Collongue B. P. 163, 69131 ECULLY Cedex, France.

In general, the above paper is directed to discrimination of an audio channel into speech/music/silence/and noise which helps improving scene segmentation. Four approaches for audio class discrimination are proposed: A "model-based approach" where models for each audio class are created, the models being based on low level features of the audio data such as cepstrum and MFCC. A "metric-based segmentation approach" uses distances between neighbouring windows for segmentation. A "rule-based approach" comprises creation of individual rules for each class wherein the rules are based on high and low level features. Finally, a "decoder-based approach" uses the hidden Makrov model of a speech recognition system wherein the hidden Makrov model is trained to give the class of an audio signal.

Furthermore, this paper describes in detail speech, music and silence properties to allow generation of rules describing each class according to the "rule based approach" as well as gender detection to detect the gender of a speech signal.

"Audio Feature Extraction and Analysis for Scene Segmentation and Classification" is disclosed by Zhu LIU and Yao WANG of the Polytechnic University Brooklyn, USA together with Tsuhan CHEN of the Carnegie Mellon University, Pittsburg, USA. This paper describes the use of associated audio information for video scene analysis of video data to discriminate five types of TV programs, namely commercials, basketball games, football games, news report and weather forecast.

According to this paper the audio data is divided into a plurality of clips, each clip comprising a plurality of frames.

A set of low level audio features comprising analysis of volume contour, pitch contour and frequency domain features as bandwidth are proposed for classification of the audio data contained in each clip.

Using a clustering analysis, the linear separability of different classes is examined to separate the video sequence into the above five types of TV programs.

Three layers of audio understanding are discriminated in this paper: In a "low-level acoustic characteristics layer" low level generic features such as loudness, pitch period and bandwidth of an audio signal are analysed. In an "intermediate-level acoustic signature layer" the object that produces a particular sound is determined by comparing the respective acoustic signal with signatures stored in a database. In a "high level semantic-model" some a prior known semantic rules about the structure of audio in different scene types (e.g. only speech in news reports and weather forecasts, but speech with noisy background in commercials) are used.

To segment the audio data into audio meta patterns sequences of audio classes of consecutive audio clips are used.

To further enhance accuracy of the above described method, it is proposed to combine the analysis of the audio data of video data with an analysis of the visual information comprised in the video data (e.g. the respective colour patterns and shape of imaged objects).

The patent U.S. Pat. No. 6,185,527 discloses a system and method for indexing an audio stream for subsequent information retrieval and for skimming, gisting and summarising the audio stream. The system and method includes use of special audio prefiltering such that only relevant speech segments that are generated by a speech recognition engine are indexed. Specific indexing features are disclosed that improve the precision and recall of an information retrieval system used after indexing for word spotting. The described method includes rendering the audio stream into intervals, with each interval including one or more segments. For each segment of an interval it is determined whether the segment exhibits one or more predetermined audio features such as a particular range of zero crossing rates, a particular range of energy, and a particular range of spectral energy concentration. The audio features are heuristically determined to represent respective audio events, including silence, music, speech, and speech on music. Also, it is determined whether a group of intervals matches a heuristically predefined meta pattern such as continuous uninterrupted speech, concluding ideas, hesitations and emphasis in speech, and so on, and the audio stream is then indexed based on the interval classification and meta pattern matching, with only relevant features being indexed to improve subsequent precision of information retrieval. Also, alternatives for longer terms generated by the speech recognition engine are indexed along with respective weights, to improve subsequent recall.

Thus, it is inter alia proposed to automatically provide a summary of an audio stream or to gain an understanding of the gist of an audio stream.

Algorithms which generate indices from automatic acoustic segmentation are described in the essay "Acoustic Segmentation for Audio Browsers" by Don KIMBER and Lynn WILCOX. These algorithms use hidden Markov models to segment audio into segments corresponding to different speakers or acoustic classes. Types of proposed acoustic classes include speech, silence, laughter, non-speech sounds and garbage, wherein garbage is defined as non-speech sound not explicitly modelled by the other class models.

An implementation of the known methods is proposed by George TZANETAKIS and Perry COOK in the essay "MARSYAS: A framework for audio analysis" wherein a client-server architecture is used.

Nowadays, as a consequence of globalization and the increasing competition between a large number of television broadcasting companies, it is very likely that a user is faced with the situation of selecting a particular programme among many similar programmes. For example, it is likely that the user will find 20 similar talk shows in one evening and/or 4 different football matches on the same evening.

Although it is possible to record all of said talk shows and all said football matches to a suitable recording medium by using e.g. a digital video recorder, a user most probably will not have the time to actually watch all of said programmes.

Therefore, it would be highly appreciated by the user if he had information which programme out of the plurality of programmes stored on the recording medium is most interesting according to his present desire.

A suggestion engine (e.g. an EPG system) which makes use of category information and programme information is not capable to select the most exciting/interesting programme of a certain category.

Therefore, the user does not know whether e.g. a football match between Brazil and Germany or a football match between Italy and England (which both belong to the same category) is more interesting.

Furthermore, the user does not know whether an unknown movie or an unknown talk show meets his current desire more.

In summary, the lack of a discriminative ability among programmes of equal category to the user is a serious disadvantage of the prior art.

Furthermore, according to the prior art automatic dissection of segmented audio signals is not possible. This is another disadvantage of the above described prior art.

SUMMARY

It is the object of the present invention to overcome the above cited disadvantages and to provide an apparatus and a method for automatic dissection of segmented audio signals which is capable to rank programmes comprised in said audio signals.

The above object is solved in an apparatus for automatic dissection of segmented audio signals by the combination of features of independent claim 1.

Furthermore, the above object is solved by a method for automatic dissection of segmented audio signals comprising the combination of features of independent claim 17.

Further developments are set forth in the dependent claims.

According to the present invention an apparatus for automatic dissection of segmented audio signals comprises content detection means for detecting programmes and contents belonging to the respective programmes in the segmented audio signal, programme weighting means for weighting each programme comprised in the audio signal based on the contents of the respective programme detected by the content detection means and programme ranking means for identifying programmes of the same category and ranking said programmes based on a weighting result for each programme provided by the programme weighting means.

In the present document general subject matter which is comprised in an audio signal is referred to as "category". Said category might be "news" or "sports", for example, if the audio signal is received from a radio broadcasting station.

Self-contained audio signals belonging to the same category are referred to as "programme". For example, each single telecast, each single feature film, each single news magazine and each single radio drama is referred to as a programme in the present document.

Each programme usually contains a plurality of self-contained activities (important events). In this regard, only activities having a certain minimum importance are accounted for. If the programme is a news magazine, for example, the self-contained activities might be the different notices mentioned in the news magazine. Alternatively, if the programme is a football match said self-contained activities might by e.g. kick-off, penalty kick, throw in etc.

In the present document, self-contained activities which meet a minimum importance and belong to a certain programme of a certain category are referred to as "contents".

Thus, according to the present document the audio signals belonging to a certain programme of a certain category are further classified with respect to their contents.

By weighting each programme detected in the audio signal based on contents comprised in the respective programme it is possible to calculate a rank for each programme.

Said "rank" indicates the relevance the respective programme has depending on the included contents.

Thus, by using the inventive apparatus for automatic dissection of segmented audio signals, it is possible to rank audio signals and therefore to allow a user to decide which programme out of a plurality of programmes suits his desire most.

Preferably, at least one information signal for identifying programmes included in said audio signals and for identifying contents included in said programmes is provided.

By using said information signal, detection of programmes and contents belonging to the respective programme easily can be performed.

According to a preferred embodiment of the present invention, said content detection means detects a distribution of the contents in each programme, wherein said programme weighting means uses said distribution of the contents in each programme detected by the content detection means for weighting the respective programme.

By identifying the distribution of the contents in each programme and by using said distribution when weighting the programmes the occurrence of interesting and/or important events in each programme can be determined with ease.

For example, a programme having an equal distribution of contents but only a small number of contents might be ranked as being rather uniform but even monotonous. To the contrary, a programme having plenty of contents and a distribution of said contents which shows an accumulation of contents towards the end of the programme might be ranked as a thrilling programme, for example.

Advantageously, said content detection means detects for each content of a respective programme a total duration and/or a number of occurrences and/or a duration normalised by a total duration of the respective programme, wherein said programme weighting means uses said total duration of each content and/or said number of occurrences of each content and/or said duration of each content normalised by the total duration of the respective programme detected by the content detection means for weighting the respective programme.

The above features "total duration of each content", "number of occurrences of each content" and "duration of each content normalised by a total duration of the respective programme" are very suitable to characterise a programme with respect to the distribution of contents in said programme.

Moreover, said features can be calculated with ease.

It is preferred that individual weighting factors for each content are provided, wherein the programme weighting means weights each content comprised in the respective programme with the respective individual weighting factor for weighting the respective programme.

Therefore, different kinds of contents have a different influence on the weighting result of the programme weighting means.

If the programme is a football match, for example, the weighting factor for the content "goal" might be higher than the weighting factor for the content "throw in".

Thus, different significance of respective contents can be accounted for.

Furthermore, it is beneficial if the weighting factors are generated heuristically.

Thus, a set of predefined weighting factors which meets the requirements of a typical user can be provided. Therefore, a cumbersome manual definition of the weighting factors can be avoided while still receiving very good results with respect to the weighted programmes.

Alternatively, the weighting factors might be defined manually by a user.

Therefore, personal desires of a user can be accounted for. Furthermore, adaptations to the current constitution and the current desire of a user are possible. This is performed e.g. by observing which contents out of a recorded programme preferably are watched by the user and which contents are skipped by the user (e.g. by going fast-forward).

If the programme is football, for example, a certain user might be of the opinion that the content "throw in" is not important while the content "free kick" is as important as the content "goal". Therefore, the user might define the weighting factor for the content "throw in" as zero while the weighting factors for the contents "free kick" and "goal" might be set identical.

Favourably, the content detection means generates a content vector for identifying the contents comprised in each programme and the weighting factors for each content are provided as a weighting vector, wherein the programme weighting means weights each programme by multiplication of the content vector and the weighting vector.

Thus, weighting of the contents comprised in a programme can be performed by a simple multiplication with the respective weighting vector.

With programmes belonging to different categories it is a problem that the typical distribution of contents in the programmes varies depending on the category of a respective programme.

If the category is e.g. "news", a rather uniform distribution of the contents has to be expected since the typical programme "news magazine" usually consists of consecutive notices of equal importance. In contrast, if the category is "sports" and the programme is football, for example, an uneven distribution of the contents has to be expected since the events "foul", "throw in" and "goal" might happen at any instant during the whole programme.

To solve this problem, according to a further preferred embodiment of the present invention, the apparatus for automatic dissection of segmented audio signals further comprises cross category ranking means for identifying weighted programmes which belong to different categories, normalising said weighted programmes and ranking said normalised and weighted programmes based on a normalisation result.

Thus, programmes which belong to different categories are normalised to account for the different typical distributions of contents in the respective categories.

Therefore, the inventive apparatus for automatic dissection of segmented audio signals still provides good results when ranking programmes which belong to different categories.

Favourably, said normalisation is performed by the cross category ranking means according to the following formula:

Normalised_Ranking_Score1$(c,i)$=function($W$(1)$I$(1)/$F(c,1)$+$W$(2)$I$(2)/$F(c,2)$+ ... +$W(N)I(N)/F(c,N)$); with 1, 2, ... , N being an index identifying the contents of a respective programme;
W(N) being a weighting vector comprising weighting factors for the contents 1 to N;
I(N) being a content vector comprising the distribution of contents 1-N in the respective programme;
c being a category index;
i being a programme index in category c; and
F(c,N) being a normalisation factor corresponding to content N in category c, wherein said normalisation factor F(c,N) is defined as the average duration or occurrence of content N for programmes of category c.

By dividing the weighted contents of each programme (product of the respective content and the respective weighting factor) by a normalisation factor corresponding to the respective content in the respective category, the different distributions of contents in programmes of different categories are accounted for.

Alternatively, said normalisation is performed by the following formula:

Normalised_Ranking_Score2$(c,i)$=function(($W$(1)$I$(1)+$W$(2)$I$(2)+ ... +$W(N)I(N))/S(c)$) with 1, 2, ... , N being an index identifying the contents of a respective programme;
W(N) being a weighting vector comprising weighting factors for the contents 1 to N;
I(N) being a content vector comprising the distribution of contents 1-N in the respective programme;
c being a category index;
i being a programme index in category c; and
S(c) being a second normalisation factor depending on category c, wherein said second normalisation factor S(c) is defined as the mean of average non-normalised ranking score for programmes in category c.

Advantageously, the apparatus for automatic dissection of segmented audio signals further comprises a viewing statistic database comprising raw audio signals previously selected by a user and/or acoustic features extracted from audio signals previously selected by a user, wherein the programme weighting means uses information stored in the viewing statistic database for weighting each programme.

By using information stored in a viewing statistic database for weighting each programme with respect to the contents of the respective programme detected by the content detection means, an automatic personalisation of the inventive apparatus for automatic dissection of segmented audio signals to an individual user is performed.

Therefore, no manual input of weighting factors is necessary to adjust the apparatus to the individual desire of a user.

In this case it is preferred, that the information stored in the viewing statistic database is analysed by speech recognition means to detect contents included in said information, wherein the programme weighting means weights each contents of a respective programme detected by the content detection means based on the frequency of occurrence of said content in the information stored in the viewing statistic database.

By analysing the information stored in the viewing statistic database by using speech recognition means to detect contents included in said information, contents which are preferred by a user can be detected with ease.

Therefore, the weighting factor for said contents automatically can be adapted to account for the preferences of the respective user.

Favourably, the apparatus for automatic dissection of segmented audio signals further comprises an user interface comprising a display for displaying information with respect to the ranked programmes to an user.

In this case it is beneficial, if said user interface further comprises input means for allowing a manual input of weighting factors for the programme weighting means by an user and/or requesting a certain type of category and/or a certain number of ranked programmes to be displayed.

Therefore, the number of displayed programmes can be reduced while the clarity of the information displayed on the display is enhanced.

Furthermore, the user might request for the programmes which are ranked highest independently from the respective category or might request e.g. for the five most interesting programmes of a certain category.

Advantageously, the audio signal is part of a video signal, the video signal being composed of at least an audio signal, a picture signal and an information signal, wherein the information signal comprises information regarding to the programmes and respective contents comprised in the video signal.

Thus, the inventive apparatus for automatic dissection of segmented audio signals is not only capable to rank audio signals but additionally to rank video signals associated with said audio signals.

According to the present invention, a method for automatic dissection of segmented audio signals comprises the following steps:

detecting programmes and contents belonging to said programmes in a segmented audio signal;

weighting each programme comprised in the audio signal based on the contents of the respective programme;

identifying programmes of the same category; and ranking said programmes based on a weighting result for each programme provided by the step of weighting each programme.

Favourably, said step of detecting programmes and contents belonging to said programmes in a segmented audio signal comprises detection a distribution of the contents in each programme, wherein the distribution of the contents in each programme is used in said step of weighting each programme.

It is beneficial, if said step of detecting programmes and contents belonging to said programmes in a segmented audio signal comprises detection for each content of a respective programme a total duration and/or a number of occurrences and/or a duration normalised by a total duration of the respective programme, wherein said total duration of each content and/or said number of occurrences of each content and/or said duration of each content normalised by the total duration of the respective programme is used in said step of weighting each programme.

Advantageously, individual weighting factors for each content which are generated heuristically or defined manually by a user are used in the step of weighting each programme.

According to a preferred embodiment of the present invention, the method further comprises the steps of:

identifying weighted programmes which belong to different categories;

normalising said weighted programmes; and ranking said normalised and weighted programmes.

Favourably, the step of weighting each programme comprises using information stored in a viewing statistic database for weighting each programme, the information stored in the viewing statistic database comprising raw audio signals previously selected by a user and/or acoustic features extracted from audio signals previously selected by a user.

In this case it is beneficial, if the method further comprises the step of analysing the information stored in the viewing statistic database by speech recognition means to detect contents included in said information, wherein the step of weighting each programme comprises weighting each contents of a respective programme based on the frequency of occurrence of said content in the information stored in the viewing statistic database.

Preferably, the method further comprises the step of displaying information with respect to the ranked programmes to an user.

The present invention is further directed to a software product comprising a series of state elements which are adapted to be processed by a data processing means of a mobile terminal such, that a method according to one of the claims 17 to 24 may be executed thereon.

BRIEF DESCRIPTION OF THE SEVERAL VIEWS OF THE DRAWINGS

In the following detailed description, the present invention is explained by reference to the accompanying drawings, in which like reference characters refer to like parts throughout the views, wherein.

DETAILED DESCRIPTION

Figure 1:
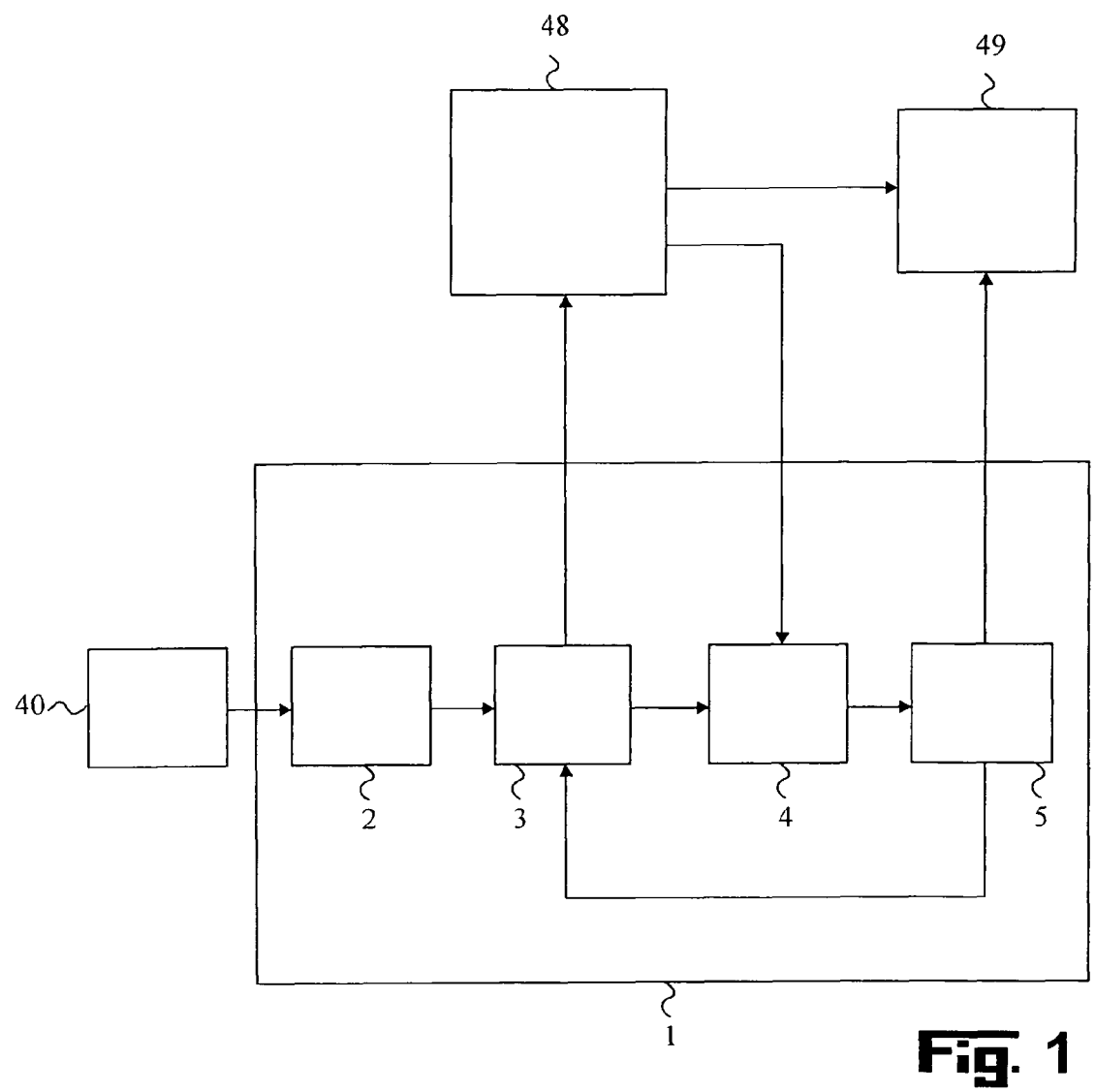
FIG. 1 shows a block diagram of an apparatus for automatic dissection of segmented audio signals according to a first preferred embodiment of the present invention.

FIG. 1 shows an apparatus for automatic dissection of segmented audio signals according to a first preferred embodiment of the present invention.

The inventive apparatus for automatic dissection of segmented audio signals 1 comprises content detection means 2, programme weighting means 3, programme ranking means 4 and a user interface 5.

Segmented audio signals are supplied to the content detection means 2. In the present embodiment, said segmented audio signals are part of segmented video signals.

Said segmented video signals primarily are classified with respect to their general subject matter. In the following, said general subject matter is referred to as "category".

If the video signals are a tv-broadcast, for example, said categories (general subject matter) might be e.g. "news", "sports", "movie" or "documentary film".

Self-contained video signals belonging to the same category are referred to as "programme".

For example, each single feature film and each single newsmagazine of the respective category "movie" and "news" is referred to as "programme".

Each programme contains a plurality of self-contained activities having a certain minimum importance (important events). In the following, said self-contained activities (events) which are included in a certain programme and meet a minimum importance are called "contents".

If the category is "sports" and the programme is a certain football match, for example, said contents might be "kick-off", "penalty kick", "throw-in" etc.

Thus, segmented audio signals supplied to the content detection means 2 are associated to segmented video signals which are firstly classified with respect to their category. Within each category the segmented video signals are classified with respect to their programme, wherein the programmes are further classified with respect to their respective contents.

In the present example, the segmented video signals supplied to the content detection means 2 of the inventive apparatus for automatic dissection of segmented audio signals 1 are composed of at least an audio signal, a picture signal and an information signal.

The information signal is provided as a meta data file comprising information regarding to the programmes and respective contents comprised in the segmented video signal.

In detail, the information signal comprises a start time and an end time of each programme, an identification code for each programme, said identification code further comprising information which category the respective programme belongs to, a start time and an end time of each content comprised in each programme together with information identifying the actual self-contained activity (important event) comprised in the respective content.

Figure 4:
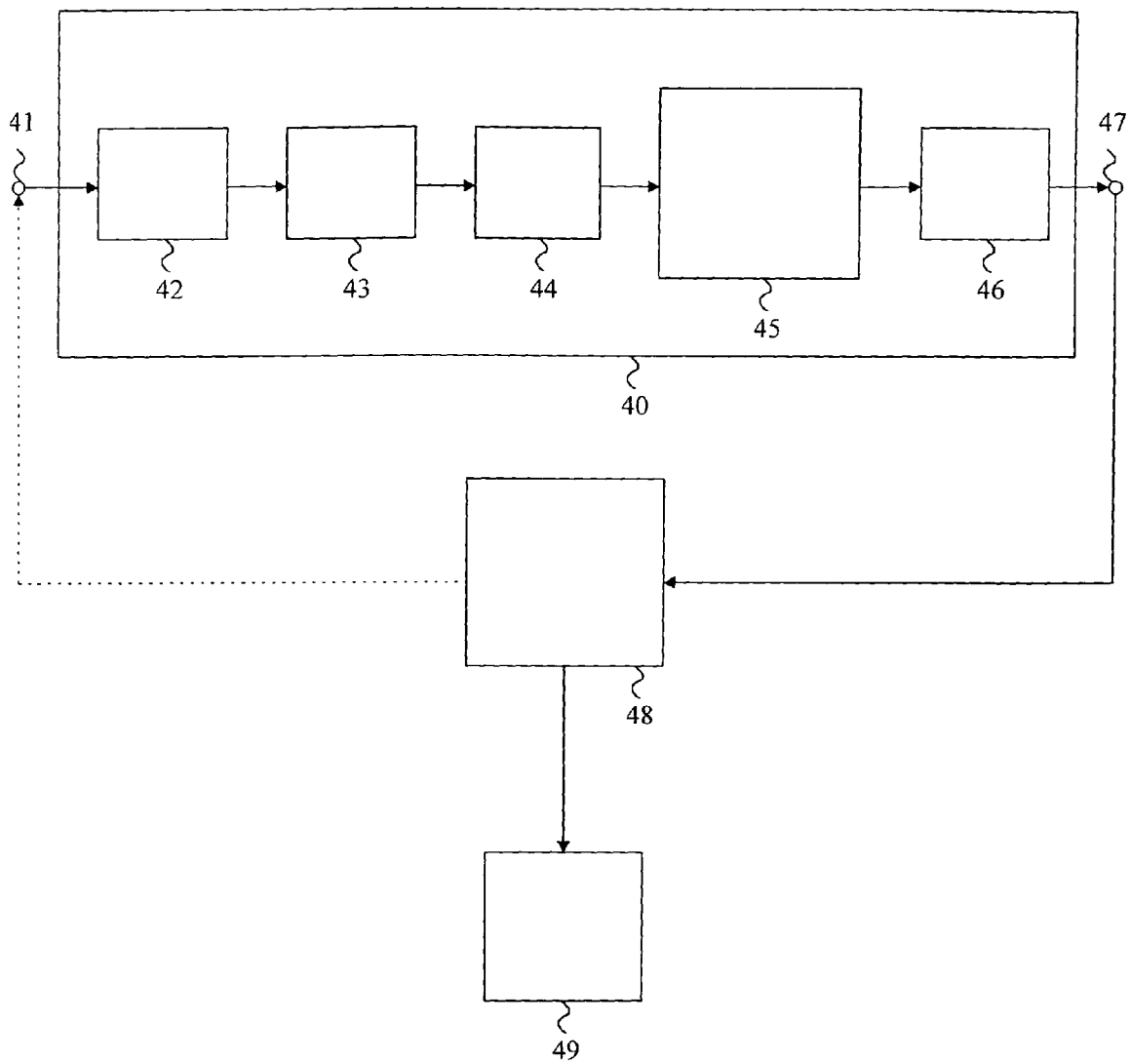
FIG. 4 shows a block diagram of a segmentation apparatus according to the prior art.
Figure 5:
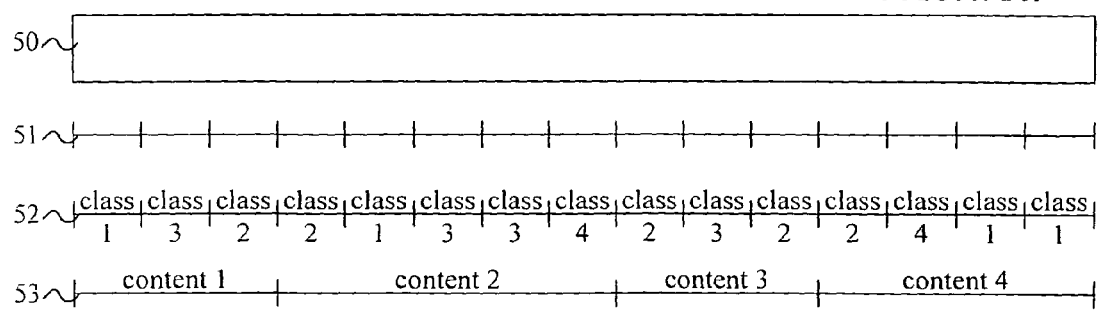
FIG. 5 schematically shows the effect the segmentation apparatus according to the prior art has on audio signals.

In the present embodiment, the segmented video signal is generated by a conventional segmentation apparatus 40 which is shown in FIG. 4.

The content detection means 2 detects programmes and contents belonging to the respective programmes in the segmented audio signal comprised in the segmented video signal by using the information signal comprised in the segmented video signal.

Furthermore, the content detection means 2 detects a distribution of contents in each programme by detecting a duration of each content normalised by a total duration of the respective programme.

Alternatively, the content detection means 2 might detect the distribution of the contents in each programme by detecting a total duration of each content and/or a number of occurrences of each content.

The content detection means 2 is connected to a programme weighting means 3.

The programme weighting means 3 weights each programme comprised in the audio signal based on the distribution of contents of the respective programme detected by the content detection means 2.

In the present embodiment, said weighting is performed by the programme weighting means 3 by using the duration of each content normalised by the total duration of the respective programme which is provided for each content of a each programme by the content detection means 2.

Alternatively, said weighting might be performed by the programme weighting means 3 by using the total duration of each contents and/or the number of occurrences of each content provided by the content detection means 2.

A plurality of heuristically generated individual weighting factors for each content are stored in the programme weighting means 3.

Therefore, different kinds of contents have a different influence on a weighting result of the programme weighting means 3.

If the programme is a football match, for example, the weighting factor for the content "goal" might be higher than the weighting factor for the content "throw in".

Although the weighting factors used by the programme weighting means 3 are generated heuristically to avoid a cumbersome manual definition of the weighting factors, manual adaptation of the weighting factors by a user by using a user interface 5 is possible.

For this purpose, the user interface 5 which is connected to the programme weighting means 3 comprises a keyboard (not shown) allowing a manual input of weighting factors for the programme weighting means 3 by a user.

If the programme is football, for example, a certain user might be of the opinion that the content "throw in" is not important while the content "free kick" is as important as the content "goal". Therefore, the user might define the weighting factor for the content "throw in" as zero while the weighting factors for the contents "free kick" and "goal" might be set identical.

Thus, personal desires of a user are accounted for.

This may be performed e.g. by observing which contents out of a recorded programme preferably are watched by the user and which contents are skipped by the user (e.g. by going fast-forward).

In the present embodiment, the content detection means 2 generates a content vector [I(1) I(2) . . . I(N)] for identifying the contents comprised in each programme. Correspondingly, the weighting factors for each content are provided as a weighting vector [W(1) W(2) . . . W(N)] comprising weighting values for each respective content 1 . . . N. In this preferred embodiment, the elements included in the weighting vector are chosen in a way that the sum of all elements is 1.

In this respect it has to be emphasised that even negative weighting factors might be used.

If a user is e.g. of the opinion that discussion of a certain topic in a talk show is annoying, the presence of a content "discussion certain topic" in a programme might be punished by a negative weighting factor.

In more detail, weighting of the respective programmes if performed by the programme weighting means 3 by multiplying each content vector (comprising duration of each content which is normalised by the total duration of the respective programme) with the respective individual weighting vector.

Thus, a weighting value in the form of a vector [I(1)W(1) I(2)W(2) . . . I(N)W(N)] is calculated for each programme by the programme weighting means 3.

In the present example, said weighting value additionally comprises information allowing an identification of the respective programme in the segmented audio signals.

According to this first embodiment, the programme weighting means 3 stores the weighting value for each programme to a storage means 48. In the present example said storage means 48 is a conventional hard disc.

By storing the weighting value for each programme to the storage means 48 it is not necessary to weight all audio signals stored in said storage means 48 every time a user asks for a ranking of the programmes comprised in the audio signals stored in the storage means 48. Thus, the complexity of the calculation is reduced if at least some of the programmes are already weighted.

The programme weighting means 3 is connected to a programme ranking means 4.

The programme ranking means 4 identifies programmes of the same category and ranks said programmes based on the weighting value generated by said programme weighting means 3.

For example, a programme having an equal distribution of contents but only a small number of contents might be identified as being rather uniform but even monotonous and therefore is ranked rather low.

To the contrary, a programme having plenty of contents and a distribution of said contents which shows an accumulation of contents towards the end of the programme might be identified as a thrilling programme and therefore is ranked rather high, for example.

Alternatively, the programme ranking means 4 ranks weighting values stored in the storage means 38 which havebeen previously generated by the weighting means 3.

The ranked programmes are output to the user interface 5 comprising a display (not shown).

Furthermore, said user interface 5 comprises input means (not shown) for requesting a certain type of category and a certain number of ranked programmes to be displayed.

If the number of programmes to be displayed is e.g. "5", the 5 programmes which are ranked uppermost are displayed by the user interface 5.

If the category is e.g. "sports", only the ranked programmes belonging to the category "sports" are displayed by the user interface 5.

Therefore, by using the user interface 5 it is possible to limit display of ranked programmes to rank programmes which meet a minimum rank, wherein said minimum rank can be input manually by a user.

In the present example, the user interface 5 is further adapted to control a video signals playback apparatus 49.

By controlling the video signals playback apparatus 49, the user interface 5 is adapted to play back a video signal stored in the hard disc 48 which is connected to the video signals playback apparatus 49.

It is preferred that the inventive apparatus for automatic dissection of segmented audio signals 1 is included into a digital video recorder (which might be based on optical or magnetic discs) or a different digital audio/video apparatus, such as a personal computer, a workstation or a home server.

Alternatively, the inventive apparatus for automatic dissection of segmented audio signals 1 might be provided as a separate equipment.

In FIG. 1 separated microprocessors are used for the content detection means 2, the programme weighting means 3 and the programme ranking means 4.

Alternatively, one single microcomputer might be used to incorporate the content detection means, the programme weighting means and the programme ranking means.

Figure 2:
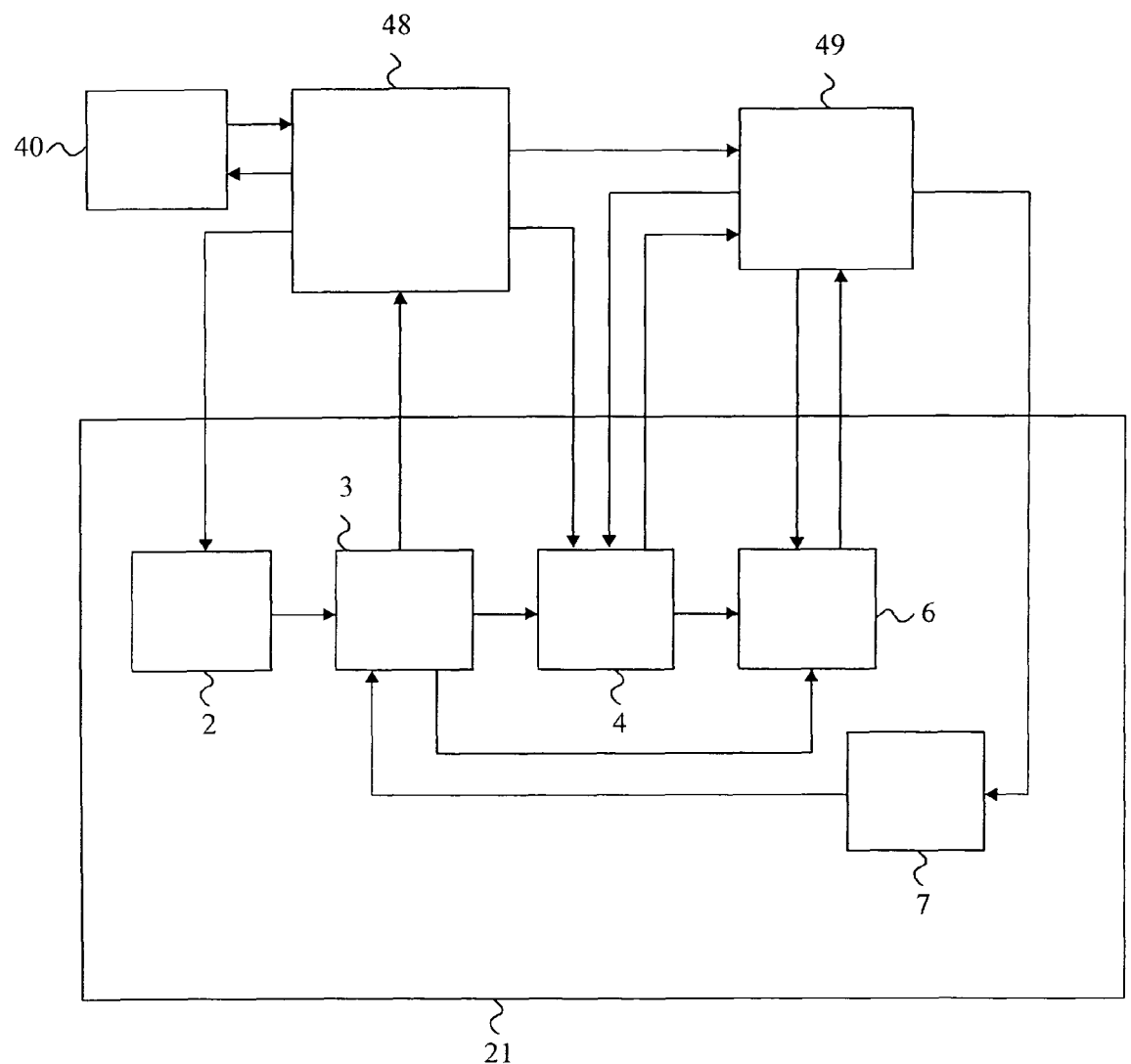
FIG. 2 shows a block diagram of an apparatus for automatic dissection of segmented audio signals according a second embodiment of to the present invention.

FIG. 2 shows a second embodiment of the inventive apparatus for automatic dissection of segmented audio signals 21 according to the present invention.

According to the second embodiment, the segmented audio signals supplied to the content detection means 2 of the apparatus for automatic dissection of segmented audio signals 21 are read out from a hard disc 48.

As it is shown in FIG. 2, the segmented audio signals comprised in the hard disc 48 might be provided by a conventional segmenting apparatus 40.

Alternatively, the segmented audio signals stored in the hard disc 48 might be segmented manually.

In addition to the first embodiment shown in FIG. 1, the apparatus for the automatic dissection of segmented audio signals 21 according to the second embodiment further comprises cross category ranking means 6 for identifying programmes weighted by the weighting means 3 which belong to different categories.

With programmes belonging to different categories it is a problem that the typical distribution of contents in the programmes varies depending on the category of a respective programme.

If the category is e.g. "news", a rather uniform distribution of the contents has to be expected since the typical programme "news magazine" usually consists of consecutive notices of equal importance. In contrast, if the category is "sports" and the programme is football, for example, an uneven distribution of the contents has to be expected since the events "foul", "throw in" and "goal" might happen at any instant during the whole programme.

Therefore, ranking of programmes belonging to different categories based on the distribution of contents in said programmes, only, does not result in adequately ranked programmes.

To solve this problem, the cross category ranking means 6 normalises the weighted programmes and ranks said normalised and weighted programmes based on a normalisation result.

Therefore, the apparatus for automatic dissection of segmented audio signals 21 according to the second embodiment of the present invention is further capable of ranking programmes which belong to different categories.

In the present example, the normalisation is performed by the following formula:

$$\text{Normalised\_Ranking\_Score1}(c,i) = \text{function}(W(1)I(1)/F(c,1) + W(2)I(2)/F(c,2) + \ldots + W(N)I(N)/F(c,N))$$

with 1, 2, . . . , N being an index identifying the contents of a respective programme;

W(N) being a weighting vector comprising weighting factors for the contents 1 to N;

I(N) being a content vector comprising the distribution of contents 1-N in the respective programme;

c being a category index;

i being a programme index in category c; and

F(c,N) being a normalisation factor corresponding to content N in category c, wherein said normalisation factor F(c,N) is defined as the average duration or occurrence of content N for programmes of category c.

By dividing the weighted contents of each programme (product of the respective content vector and the respective weighting vector) by a normalisation factor corresponding to the respective content in the respective category, the different distribution of contents in programmes of different categories is automatically accounted for.

Alternatively, said normalisation might be performed by the following formula:

$$\text{Normalised\_Ranking\_Score2}(c,i) = \text{function}((W(1)I(1) + W(2)I(2) + \ldots + W(N)I(N))/S(c))$$

with 1, 2, . . . , N being an index identifying the contents of a respective programme;

W(N) being a weighting vector comprising weighting factors for the contents 1 to N;

I(N) being a content vector comprising the distribution of contents 1-N in the respective programme;

c being a category index;

i being a programme index in category c; and

S(c) being a second normalisation factor depending on category c, wherein said second normalisation factor S(c) is defined as the mean of average non-normalised ranking score for programmes in category c.

The cross category ranking means 6 is connected to both the programme weighting means 3 and the programme ranking means 4.

Thus, the cross category ranking means 6 is capable of ranking both programmes weighted by the programme weighting means 3 and programmes which are pre-ranked by the programme ranking means 4.

Furthermore, both the programme ranking means 4 and the cross category ranking means 6 are capable to control a user interface. In the present embodiment, said user interface is included in a video signals playback apparatus 49.

The user interface included in said video signals playback apparatus 49 comprises a display (not shown) for displaying information with respect to the ranked programmes to a user and input means (not shown) for requesting a certain type of category and a certain number of ranked programmes to be displayed.

Moreover, the apparatus for automatic dissection of segmented audio signals 21 according to the second embodiment comprises a viewing statistic database 7 comprising raw audio signals previously selected by a user.

Alternatively or additionally, the viewing statistic database might comprise acoustic features extracted from audio signals previously selected by a user.

The viewing statistic database 7 is connected to the programme weighting means 3.

In the present example, the programme weighting means 3 weights each contents of a respective programme detected by the content detection means 2 based on the frequency of occurrence of said content in the viewing statistic database 7.

In the present embodiment, the audio signals stored in the viewing statistic database 7 are analysed by speech recognition means (not shown) included in the programme weighting means 3 to detect contents included in said audio signals.

The audio signals stored in the viewing statistic database 7 might be provided by a video signals playback apparatus 49 which is connected to the viewing statistic database 7.

By using information stored in the viewing statistic database 7 for weighting each programme with respect to the contents of the respective programme detected by the content detection means 2, an automatic personalisation of the inventive apparatus for automatic dissection of segmented audio signals 21 to an individual user is performed.

Therefore, no manual input of weighting factors is necessary to adjust the apparatus for automatic dissection of segmented audio signals 21 to the individual desire of a user.

According to the second embodiment, the viewing statistic database 7 is provided separately by a hard disc. Alternatively, said viewing statistic databases might be included in the programme weighting means as a FLASH-memory, for example.

Furthermore, FIG. 2 shows both a hard disc 48 for storing segmented audio signals and a separate viewing statistic database 7.

Alternatively, the viewing statistic database might be stored into the hard disc 48.

Figure 3:
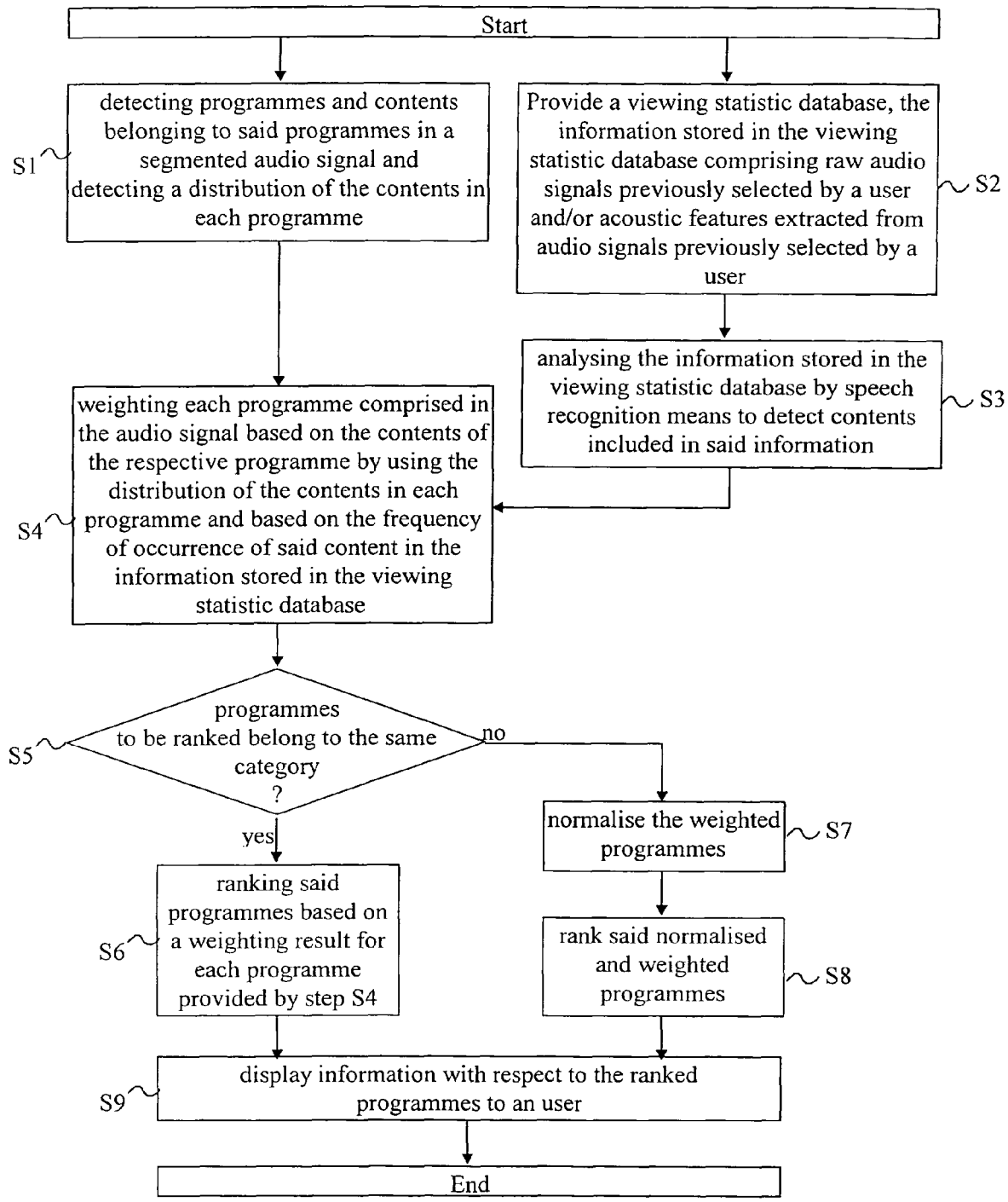
FIG. 3 shows a flow diagram of a method for automatic dissection of segmented audio signals according to the present invention.

FIG. 3 shows a flow diagram of the inventive method for automatic dissection of segmented audio signals.

In a first step S1 programmes and contents belonging to said programmes are detected in a segmented audio signal together with a distribution of the contents in each programme.

In the meantime, in step S2 a viewing statistic database is provided.

The information stored in the viewing statistic database comprises raw audio signals previously selected by a user and acoustic features extracted from audio signals previously selected by a user.

In the following step S3 the information stored in the viewing statistic database is analysed by speech recognition means to detect contents included in said information.

In step S4 each programme comprised in the audio signal is weighted based on the contents of the respective programme by using the distribution of the contents in each programme and based on the frequency of occurrence of said content in the information stored in the viewing statistic database.

Afterwards, in step S5 it is decided whether the programmes to be ranked belong to the same category.

If it is decided that the programmes to be ranked belong to the same category, said programmes are ranked in step S6 based on a weighting result for each programmne provided by step S4.

If it is decided that the programmes to be ranked do not belong to the same category in step S6, the weighted programmes are normalised in step S7.

Afterwards, said normalised and weighted programmes are ranked in step S8.

In the following step S9, information with respect to the ranked programmes is displayed to a user.

According to the present invention, by weighting each programme detected in the segmented audio signals based on contents comprised in the respective programme it is possible to calculate a rank for each programme.

Said rank indicates the relevance the respective programme has depending on the contents included in said programmes. The desire of a user is taken into account by providing different weighting factors for each content.

Thus, by using the inventive apparatus for automatic dissection of segmented audio signals it is possible to rank programmes included in segmented audio signals and therefore to allow a user to decide which programme out of a plurality of programmes suits his desire most.

To enhance clarity of the FIGS. 1 and 2 supplementary means such as power supplies, buffer memories etc. are not shown.

According to the above embodiments, segmented audio signals, segmented video signals and weighted programmes are stored into the hard disc 48.

It is evident that even different hard discs or other kind of memories (Flash-memories, EEPROMS, floppy discs, writable compact discs etc.) might be used for storing each segmented audio signals, segmented video signals and weighted programmes.

Although the viewing statistic database has been described with respect to the second embodiment, only, said viewing statistic database easily can be included in the apparatus for automatic dissection of segmented audio signals according to the first embodiment, too.

It is preferred that the inventive apparatus for automatic dissection of segmented audio signals is realised by use of a personal computer or workstation.

Alternatively, the inventive apparatus for automatic dissection of segmented audio signals might be included in a video signals playback apparatus, e.g. a digital video recorder or DVD-writer.

According to a third embodiment of the present invention (which is not shown in the figures), the above object is solved by a software product comprising a series of state elements which are adapted to be processed by a data processing means of a mobile terminal such, that a method according to one of the claims 17 to 24 may be executed thereon.

As is evident from the foregoing description and drawings, the present invention provides substantial improvements in an apparatus and a method for automatic dissection of segmented audio signals. It will also be apparent that various details of the illustrated examples of the present invention, shown in there preferred embodiments, may be modified without departing from the inventive concept and the scope of the appended claims.

The invention claimed is:

1. An apparatus for automatic dissection, weighting and ranking of segmented audio signals, the apparatus comprising:

a content detection means that is configured to receive a segmented audio signal, to automatically detect programs in the segmented audio signal and to automatically segment the programs into contents, the contents being important events comprised in the programs;

a program weighting means for weighting each program comprised in the audio signal based on the contents of the respective program detected by the content detection means;

a viewing statistic database comprising raw audio signals previously selected by a user and/or acoustic features extracted from audio signals previously selected by a user, wherein the program weighting means uses information stored in the viewing statistic database for weighting each program;

a program ranking means for identifying programs of the same category and ranking the programs based on a weighting result for each program provided by the program weighting means; and a cross category ranking means for identifying weighted programs which belong to different categories, normalizing the weighted programs and ranking the normalized and weighted programs based on a normalization result, the normalization being performed by the cross category ranking means according to the following formula:

$$\text{Normalized\_Ranking\_Score1}(c,i) = \text{function}(W(1)I(1)/F(c,1) + W(2)I(2)/F(c,2) + \ldots + W(N)I(N)/F(c,N)),$$

with 1, 2, ..., N being an index identifying the contents of a respective program, $W(N)$ being a weighting vector comprising weighting factors for the contents 1 to N, $I(N)$ being a content vector comprising the distribution of contents 1-N in the respective program, c being a category index, i being a program index in category c, and $F(c,N)$ being a normalization factor corresponding to content N in category c, wherein the normalization factor $F(c,N)$ is defined as the average duration or occurrence of content N for programs of category c.

2. The apparatus for automatic dissection, weighting and ranking of segmented audio signals according to claim 1, wherein at least one information signal for identifying programs included in the audio signals and for identifying contents included in the programs is provided.

3. The apparatus for automatic dissection, weighting and ranking of segmented audio signals according to claim 1, wherein:

the content detection means detects a distribution of the contents in each program; and the program weighting means uses the distribution of the contents in each program detected by the content detection means for weighting the respective program.

4. The apparatus for automatic dissection, weighting and ranking of segmented audio signals according to claim 1, wherein:

the content detection means detects for each content of a respective program a total duration and/or a number of occurrences and/or a duration normalized by a total duration of the respective program; and the program weighting means uses the total duration of each content and/or the number of occurrences of each content and/or the duration of each content normalized by the total duration of the respective program detected by the content detection means for weighting the respective program.

5. The apparatus for automatic dissection, weighting and ranking of segmented audio signals according to claim 1, wherein, individual weighting factors for each content are provided, wherein the program weighting means weights each content comprised in the respective program with the respective individual weighting factor for weighting the respective program.

6. The apparatus for automatic dissection, weighting and ranking of segmented audio signals according to claim 5, wherein the weighting factors are generated heuristically.

7. The apparatus for automatic dissection, weighting and ranking of segmented audio signals according to claim 5, wherein the weighting factors are defined manually by a user.

8. The apparatus for automatic dissection, weighting and ranking of segmented audio signals according to claim 5, wherein:

the content detection means generates a content vector for identifying the contents comprised in each program; and the weighting factors for each content are provided as a weighting vector, wherein the program weighting means weights each program by multiplication of the content vector and the weighting vector.

9. The apparatus for automatic dissection, weighting and ranking of segmented audio signals according to claim 1, wherein the information stored in the viewing statistic database is analysed by speech recognition means to detect contents included in the information, wherein the program weighting means weights each contents of a respective program detected by the content detection means based on the frequency of occurrence of the content in the information stored in the viewing statistic database.

10. The apparatus for automatic dissection, weighting and ranking of segmented audio signals according to claim 1, wherein the apparatus for automatic dissection, weighting and ranking of segmented audio signals further comprises:

an user interface comprising a display for displaying information with respect to the ranked programs to an user.

11. The apparatus for automatic dissection, weighting and ranking of segmented audio signals according to claim 10, wherein the user interface further comprises:

input means for allowing a manual input of weighting factors for the program weighting means by an user and/or requesting a certain type of category and/or a certain number of ranked programs to be displayed.

12. The apparatus for automatic dissection, weighting and ranking of segmented audio signals according to claim 1, wherein, the audio signal is part of a video signal, the video signal being composed of at least an audio signal, a picture signal and an information signal, wherein the information signal comprises information regarding the programs and respective contents comprised in the video signal.

13. A method for automatic dissection, weighting and ranking of segmented audio signals comprising:

supplying segmented audio signals to a detecting device;

automatically detecting by the detecting device programs in the segmented audio signals and automatically segmenting the programs into contents, the contents being important events comprised in the programs;

weighting each program comprised in the audio signal based on the detected contents of the respective program by using information stored in a viewing statistic database for weighting each program, wherein the information stored in the viewing statistic database comprises raw audio signals previously selected by a user and/or acoustic features extracted from audio signals previously selected by a user;

identifying programs of the same category;

ranking the programs by a program ranking device based on a weighting result for each program provided by weighting each program;

identifying weighted programs which belong to different categories;

normalizing the weighted programs; and ranking the normalized and weighted programs, the normalization being performed according to the following formula:

Normalized_Ranking_Score1$(c,i)$=function$(W(1)I(1)/F(c,1)+W(2)I(2)/F(c,2)+\ldots+W(N)I(N)/F(c,N)$,
with 1, 2, ..., N being an index identifying the contents of a respective program, W(N) being a weighting vector comprising weighting factors for the contents 1 to N, I(N) being a content vector comprising the distribution of contents 1-N in the respective program, c being a category index, i being a program index in category c, and F(c,N) being a normalization factor corresponding to content N in category c, wherein the normalization factor F(c,N) is defined as the average duration or occurrence of content N for programs of category c.

14. The method for automatic dissection, weighting and ranking of segmented audio signals according to claim 13, wherein the detecting programs and contents belonging to the programs in a segmented audio signal further comprises:
   detecting a distribution of the contents in each program, wherein the distribution of the contents in each program is used in the weighting each program.

15. The method for automatic dissection, weighting and ranking of segmented audio signals according to claim 13, wherein:
   the detecting programs and contents belonging to the programs in a segmented audio signal comprises detection for each content of a respective program a total duration and/or a number of occurrences and/or a duration normalized by a total duration of the respective program; and
   the total duration of each content and/or the number of occurrences of each content and/or the duration of each content normalized by the total duration of the respective program is used in the weighting each program.

16. The method for automatic dissection, weighting and ranking of segmented audio signals according to claim 13, wherein individual weighting factors for each content which are generated heuristically or defined manually by a user are used in the weighting each program.

17. The method for automatic dissection, weighting and ranking of segmented audio signals according to claim 13, wherein the method further comprises:
   analyzing the information stored in the viewing statistic database by the speech recognition means to detect contents included in the information,
   wherein the weighting each program comprises weighting each contents of a respective program based on the frequency of occurrence of the content in the information stored in the viewing statistic database.

18. The method for automatic dissection, weighting and ranking of segmented audio signals according to claim 13, wherein the method further comprises:
   displaying information with respect to the ranked programs to an user.

19. The software product comprising a series of state elements which are adapted to be processed by a data processing means of a mobile terminal such that a method according to claim 13 may be executed thereon.

20. Apparatus for automatic dissection, weighting and ranking of segmented audio signals, the apparatus comprising:
   a content detection device configured to receive a segmented audio signal and to automatically detect programs in the segmented audio signal and to automatically segment the programs into contents, the contents being important events comprised in the programs;
   a program weighting device configured to weight each program comprised in the audio signal based on the contents of the respective program detected by the content detection device;
   a viewing statistic database comprising raw audio signals previously selected by a user and/or acoustic features extracted from audio signals previously selected by a user, wherein the program weighting device uses information stored in the viewing statistic database for weighting each program;
   a program ranking device configured to identifying programs of the same category and ranking the programs based on a weighting result for each program provided by the program weighting device; and
   a cross category ranking device configured to identifying weighted programs which belong to different categories, normalizing the weighted programs and ranking the normalized and weighted programs based on a normalization result,
   the normalization being performed by the cross category ranking device according to the following formula:

Normalized_Ranking_Score1$(c,i)$=function$(W(1)I(1)/F(c,1)+W(2)I(2)/F(c,2)+\ldots+W(N)I(N)/F(c,N))$,
with 1, 2, ..., N being an index identifying the contents of a respective program, W(N) being a weighting vector comprising weighting factors for the contents 1 to N, I(N) being a content vector comprising the distribution of contents 1-N in the respective program, c being a category index, i being a program index in category c, and F(c,N) being a normalization factor corresponding to content N in category c, wherein the normalization factor F(c,N) is defined as the average duration or occurrence of content N for programs of category c.

21. An apparatus for automatic dissection, weighting and ranking of segmented audio signals, the apparatus comprising:
   a content detection device that is configured to receive a segmented audio signal, to automatically detect programs in the segmented audio signal and to automatically segment the programs into contents, the contents being important events comprised in the programs, and to classify the contents;
   a program weighting device for weighting and normalizing each program comprised in the audio signal based on the classification of the contents of the respective program detected by the content detection device; and
   a program ranking device for identifying programs of a same category and ranking the programs based on a weighting result for each program provided by the program weighting device,
   the program weighting device weighting and normalizing according to the following formula:

Normalized_Ranking_Score1$(c,i)$=function$(W(1)I(1)/F(c,1)+W(2)I(2)/F(c,2)+\ldots+W(N)I(N)/F(c,N))$,
with 1, 2, ..., N being an index identifying the contents of a respective program, W(N) being a weighting vector comprising weighting factors for the contents 1 to N, I(N) being a content vector comprising the distribution of contents 1-N in the respective program, c being a category index, i being a program index in category c, and F(c,N) being a normalization factor corresponding to content N in category c, wherein the normalization factor F(c,N) is defined as the average duration or occurrence of content N for programs of category c.

22. A method for automatic dissection, weighting and ranking of segmented audio signals comprising:

supplying segmented audio signals to a detecting device;

automatically detecting by the detecting device programs in the segmented audio signal and automatically segmenting the programs into contents, the contents being important events comprised in the programs, and classifying the contents;

weighting and normalizing each program comprised in the audio signal based on the classification of the detected contents of the respective program; and ranking the programs by a program ranking device based on a weighting result for each program provided by the step of weighting each program, the weighting and normalizing performed according to the following formula:

$$\text{Normalized\_Ranking\_Score1}(c,i) = \text{function}(W(1)I(1)/F(c,1) + W(2)I(2)/F(c,2) + \ldots + W(N)I(N)/F(c,N)),$$

with 1, 2, ..., N being an index identifying the contents of a respective program, W(N) being a weighting vector comprising weighting factors for the contents 1 to N, I(N) being a content vector comprising the distribution of contents 1-N in the respective program, c being a category index, i being a program index in category c, and F(c,N) being a normalization factor corresponding to content N in category c, wherein the normalization factor F(c,N) is defined as the average duration or occurrence of content N for programs of category c.

* * * * *